United States Patent
Beall et al.

(10) Patent No.: US 12,286,915 B2
(45) Date of Patent: Apr. 29, 2025

(54) HIGH POROSITY CERAMIC HONEYCOMB STRUCTURE AND METHOD OF MANUFACTURING

(71) Applicant: CORNING INCORPORATED, Corning, NY (US)

(72) Inventors: Douglas Munroe Beall, Painted Post, NY (US); Achim Karl-Erich Heibel, Corning, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 18/218,788

(22) Filed: Jul. 6, 2023

(65) Prior Publication Data

US 2023/0358154 A1 Nov. 9, 2023

Related U.S. Application Data

(63) Continuation of application No. 16/085,089, filed as application No. PCT/US2017/022859 on Mar. 17, 2017, now Pat. No. 11,739,670.

(Continued)

(51) Int. Cl.
*F01N 3/022* (2006.01)
*B01D 46/24* (2006.01)
(Continued)

(52) U.S. Cl.
CPC ....... *F01N 3/0222* (2013.01); *B01D 46/2425* (2013.01); *B01D 46/2429* (2013.01);
(Continued)

(58) Field of Classification Search
None
See application file for complete search history.

(56) References Cited

U.S. PATENT DOCUMENTS 6,818,580 B2  11/2004  Kumazawa et al.
7,141,089 B2  11/2006  Beall et al.
(Continued)

FOREIGN PATENT DOCUMENTS

EP  1340541 A1  9/2003
EP  2572770 A1  3/2013
(Continued)

OTHER PUBLICATIONS

English Translation of CN201780017943.7 Office Action Dated May 28, 2020; 12 Pages; Chinese Patent Office.
(Continued)

*Primary Examiner* — Elizabeth Collister
(74) *Attorney, Agent, or Firm* — Kevin M. Able

(57) ABSTRACT

A method of manufacturing a ceramic honeycomb structure by mixing a ceramic precursor batch composition having a median particle diameter less than or equal to about 10 μm and at least one starch-based pore former having a median particle diameter greater than or equal to about 10 μm. The method also includes forming a mixture of ceramic precursor batch composition and a starch-based pore former into a green ceramic structure having a web structure, and firing the green ceramic structure to yield a ceramic honeycomb structure.

17 Claims, 4 Drawing Sheets

Related U.S. Application Data

(60) Provisional application No. 62/309,754, filed on Mar. 17, 2016.

(51) Int. Cl.

| | | |
|---|---|---|
| *C04B 35/195* | (2006.01) | |
| *C04B 35/636* | (2006.01) | |
| *C04B 38/00* | (2006.01) | |
| *F01N 3/035* | (2006.01) | |
| *C04B 111/00* | (2006.01) | |

(52) U.S. Cl.
CPC . *B01D 46/24491* (2021.08); *B01D 46/24492* (2021.08); *B01D 46/2455* (2013.01); *B01D 46/2474* (2013.01); *B01D 46/2482* (2021.08); *B01D 46/2484* (2021.08); *C04B 35/195* (2013.01); *C04B 35/6365* (2013.01); *C04B 38/0009* (2013.01); *F01N 3/035* (2013.01); *C04B 2111/00793* (2013.01); *C04B 2111/0081* (2013.01); *C04B 2235/3217* (2013.01); *C04B 2235/349* (2013.01); *C04B 2235/5436* (2013.01); *C04B 2235/6562* (2013.01); *C04B 2235/6567* (2013.01); *C04B 2235/9607* (2013.01); *F01N 2330/06* (2013.01); *F01N 2330/30* (2013.01); *F01N 2330/48* (2013.01)

(56) References Cited

U.S. PATENT DOCUMENTS

| | | |
|---|---|---|
| 7,208,108 B2 | 4/2007 | Otsuka et al. |
| 7,559,967 B2 | 7/2009 | Oya et al. |
| 7,923,093 B2 | 4/2011 | Melscoet-Chauvel et al. |
| 7,927,682 B2 | 4/2011 | Beall et al. |
| 8,007,557 B2 | 8/2011 | Merkel |
| 8,318,286 B2 | 11/2012 | Patchett et al. |
| 8,501,296 B2 | 8/2013 | Merkel |
| 8,709,577 B2 | 4/2014 | Beall et al. |
| 8,722,172 B2 | 5/2014 | Sendo et al. |
| 8,999,224 B2 | 4/2015 | Beall et al. |
| 9,334,191 B2 | 5/2016 | Miao et al. |
| 2008/0032090 A1 | 2/2008 | Beall et al. |
| 2008/0032091 A1 | 2/2008 | Beall et al. |
| 2008/0127638 A1 | 6/2008 | Vaarkamp et al. |
| 2009/0137382 A1 | 5/2009 | Merkel |
| 2009/0220736 A1 | 9/2009 | Merkel |
| 2010/0126132 A1* | 5/2010 | Merkel ............ B01D 46/24493 55/523 |
| 2011/0130277 A1 | 6/2011 | Merkel et al. |
| 2012/0064286 A1 | 3/2012 | Hirose et al. |
| 2012/0135186 A1* | 5/2012 | Beall ................. B01D 46/2429 428/116 |
| 2014/0220294 A1 | 8/2014 | Ono et al. |

FOREIGN PATENT DOCUMENTS

| | | |
|---|---|---|
| JP | 2003-245560 A | 9/2003 |
| WO | 2008/005291 A1 | 1/2008 |

OTHER PUBLICATIONS

English Translation of JP2018548740 From Global Dossier; Dated Jul. 8, 2020; 4 Pages; Japanese Patent Office.

European Patent Application No. EP17714357.5 Office Action Dated Oct. 24, 2018; 7 Pages; European Patent Office.

Hirose et al; "Development of High Porosity Cordierite Honeycomb Substrate for SCR Application to Realize High Nox Conversion Efficiency and System Compactness"; SAE Int. J. Mater. Manf.; vol. 7, Issue 3; 2014; pp. 682-687.

International Search Report and Written Opinion of the International Searching Authority; PCT/US2017/022859; Mailed Jul. 13, 2017; 11 Pages; European Patent Office.

\* cited by examiner

HIGH POROSITY CERAMIC HONEYCOMB STRUCTURE AND METHOD OF MANUFACTURING

CROSS-REFERENCE To RELATED APPLICATIONS

This application is a continuation of U.S. application Ser. No. 16/085,089, filed on Sep. 14, 2018, which is a National Stage application under 35 U.S.C. § 371 of International Patent Application Serial No. PCT/US2017/022859, filed on Mar. 17, 2017, which claims the benefit of priority of U.S. Provisional Application Ser. No. 62/309,754 filed on Mar. 17, 2016 the contents of both are relied upon and incorporated herein by reference in their entireties.

BACKGROUND

Field

The present application generally relates to porous ceramic honeycomb structures and, more specifically, to high porosity, thin wall porous ceramic honeycomb structures.

Technical Background

Ceramic honeycomb structures are widely used in anti-pollution devices in the exhaust systems of automotive vehicles, both as catalytic converter substrates in automobiles. Ceramic honeycomb structures for use in such applications are generally formed from a matrix of thin, porous ceramic walls which define a plurality of parallel, cell channels.

SUMMARY

According to one embodiment, a ceramic honeycomb structure has a web structure comprising a plurality of intersecting channel walls forming channels and comprising: a total porosity greater than or equal to about 55%; an average channel wall thickness less than or equal to about 150 µm; a median pore diameter greater than or equal to about 10 µm; a $d_f$ less than or equal to about 0.45, where $d_f=(d_{50}-d_{10})/d_{50}$; and a strength (MOR/CFA) greater than or equal to about 900 psi.

In another embodiment, a ceramic honeycomb article comprises: a ceramic honeycomb structure having a web structure; a plurality of channels formed in the web structure; and a washcoat material on the ceramic honeycomb structure that fills at least about 50% of a pore volume of the ceramic honeycomb structure. The ceramic honeycomb structure comprises: a total porosity greater than or equal to about 55%; an average channel wall thickness less than or equal to about 150 µm; a median pore diameter greater than or equal to about 10 µm; a $d_f$ less than or equal to about 0.45, where $d_f=(d_{50}-d_{10})/d_{50}$; and a strength (MOR/CFA) greater than or equal to about 900 psi.

In an embodiment, a method of manufacturing a ceramic honeycomb structure, comprises: mixing ceramic precursor batch composition having a median particle diameter less than or equal to about 10 µm and at least one starch-based pore former having a median particle diameter greater than or equal to about 10 µm; forming a mixture of ceramic precursor batch composition and at least one starch-based pore former into a green ceramic structure having a web structure; and firing the green ceramic structure to yield the ceramic honeycomb structure having a web structure. The ceramic honeycomb structure comprises: a total porosity greater than or equal to about 55%; an average channel wall thickness less than or equal to about 150 µm; a median pore diameter greater than or equal to about 10 µm; a $d_f$ less than or equal to about 0.45, where $d_f=(d_{50}-d_{10})/d_{50}$; and a strength (MOR/CFA) greater than or equal to about 900 psi.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
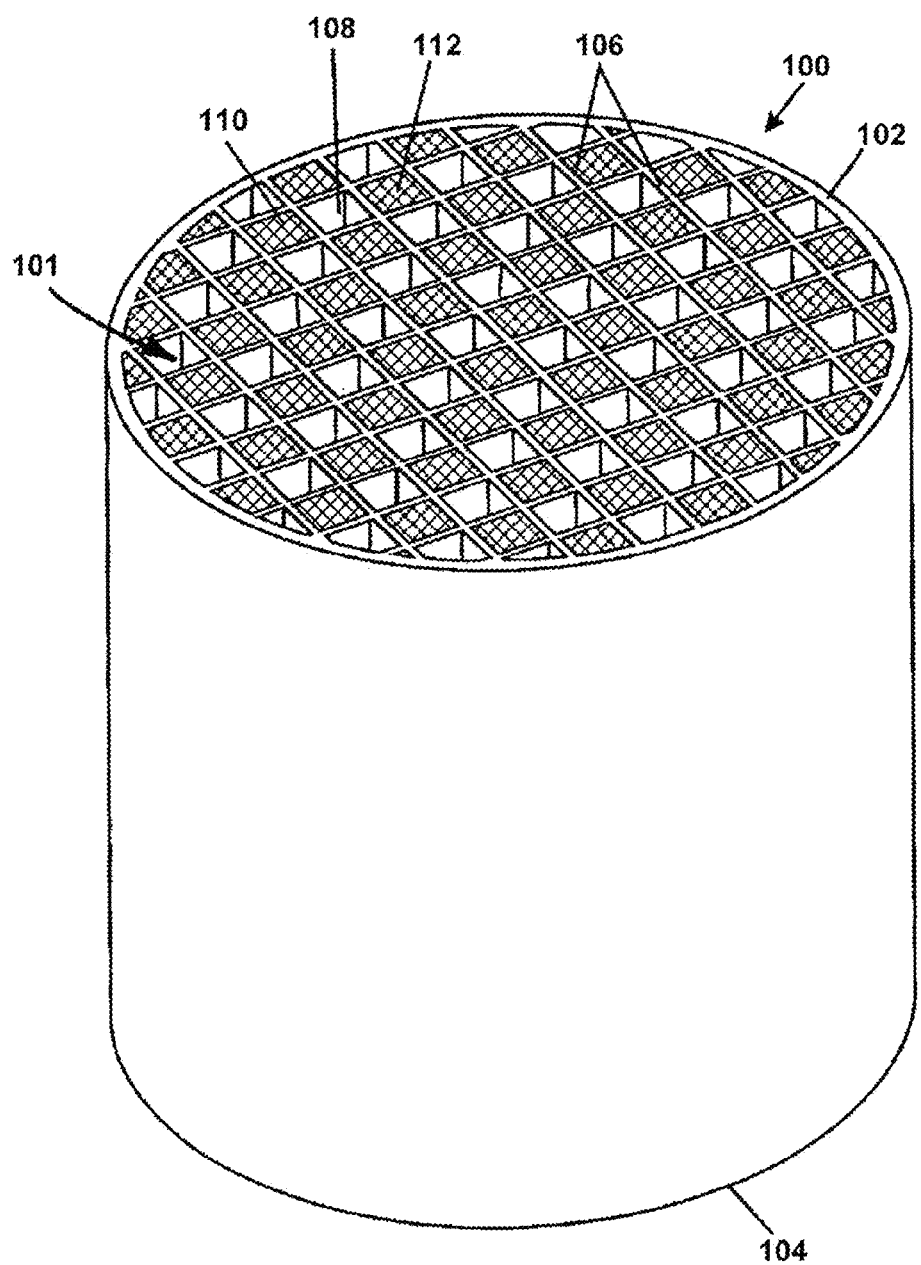
FIG. 1 schematically depicts a porous ceramic honeycomb structure according to one or more embodiments shown and described herein.

Reference will now be made in detail to embodiments of porous ceramic honeycomb structures and articles, examples of which are illustrated in the accompanying drawings. Whenever possible, the same reference numerals will be used throughout the drawings to refer to the same or like parts.

The ceramic honeycomb structures disclosed herein can be used as catalytic substrates in vehicles, such as automobiles with gasoline engines, where for example the cell channels are generally open at both ends, and a catalytic coating is applied to the outer surfaces of the walls. Exhaust gases flowing through the cell channels can then come into contact with the catalytic coatings on the surfaces of the walls. Such honeycomb substrates are referred to as flow-through substrates. In diesel systems, exhaust gases can also come into contact with catalytic coatings on the surfaces of the walls of a honeycomb structure such as deployed in SCR or DOC units. In diesel applications, the ceramic honeycomb structures may also have end-plugs in alternate cell channels to force exhaust gasses to pass through the porous webs in order to capture and filter out soot and ash particulates prior to exhaust discharge. These ceramic honeycomb structures are referred to as ceramic wall-flow particulate filters and, more specifically, as diesel particulate filters (DPF).

Application of the catalyst washcoat to the honeycomb structure alters the properties of the honeycomb structure as the washcoat is deposited on the walls and within the pores of the honeycomb structure. This results in an increase of backpressure for exhaust gasses flowing through the honeycomb. Further, temperature fluctuations experienced by honeycomb structures used in both automotive and diesel applications makes the ceramic honeycomb structures susceptible to temperature-induced cracking which leads to the degradation of the honeycomb structures.

One embodiment of a porous ceramic honeycomb structure is schematically depicted in FIG. 1. The porous ceramic honeycomb structure comprises a honeycomb comprising a plurality of cell channels formed by porous webs. In an embodiment, the webs of the honeycomb body have a total porosity P greater than or equal to about 55%, a median pore diameter greater than or equal to about 10 μm, a d-factor $d_f$ less than or equal to about 0.45, where $d_f=(d_{50}-d_{10})/d_{50}$, and a strength normalized as the modulus of rupture over the central facing area (MOR/CFA) greater than or equal to about 900 psi. The porous webs of the honeycomb body have a channel wall thickness T of less than or equal to about 150 μm. In some embodiments, the honeycomb structure also has a cell density of greater than or equal to about 200 cells per square inch (cpsi). In some embodiments, the honeycomb structure has a unimodal pore distribution. In some embodiments, the honeycomb structure has an axial coefficient of thermal expansion (CTE) of greater than or equal to about $0.5(d_{50}-5.0)$, where $d_{50}$ is expressed in microns and CTE is expressed in $10^{-7}/°$ C. and taken over the temperature range from 20 C to 800 C. In embodiments, the ceramic honeycomb structure described herein is part of a ceramic honeycomb article that further comprises a washcoat material on the ceramic honeycomb structure that fills at least about 50% of a pore volume of the ceramic honeycomb structure. The porous ceramic honeycomb structures, articles, and methods for making the porous ceramic honeycomb structures and articles will be described in more detail herein.

As used herein, the singular forms "a," "an" and "the" include plural referents unless the context clearly dictates otherwise. Thus, for example, reference to a "silica-forming source" or an "alumina-forming source" may include aspects of having two or more such forming sources, unless the context clearly indicates otherwise.

As used herein, a "wt. %" or "weight percent" or "percent by weight" of an organic component, unless specifically stated to the contrary, is based on the total weight of the total inorganics in which the component is included. All organic additions, such as, for example, pore formers and binders, are specified herein as superadditions based upon weight of 100% of the inorganics used.

Referring now to FIG. 1, a porous ceramic honeycomb structure 100 is schematically depicted. The porous ceramic honeycomb structure 100 may be used as a wall-flow filter for particulate matter filtration. For example, the porous ceramic honeycomb structure 100 may be used in filtering particulate matter from a vehicle exhaust. The porous ceramic honeycomb structure 100 generally comprises a porous ceramic honeycomb body having a plurality of cell channels 101 extending between a first end 102 and a second end 104. The plurality of generally parallel cell channels 101 formed by, and at least partially defined by, intersecting porous webs 106 that extend from the first end 102 to the second end 104. The porous ceramic honeycomb structure 100 may also include a skin formed about and surrounding the plurality of cell channels. This skin may be extruded during the formation of the webs 106 or formed in later processing as an after-applied skin, by applying a skinning cement to the outer peripheral portion of the cells.

In embodiments, the plurality of parallel cell channels 101 are generally square in cross section and are formed into a honeycomb structure. However, in alternative embodiments, the plurality of parallel cell channels in the honeycomb structure may have other cross-sectional configurations, including rectangular, round, oblong, triangular, octagonal, hexagonal, or combinations thereof. The term "honeycomb" as used herein is defined as a structure of longitudinally-extending cells formed from the webs 106 and preferably having a generally repeating grid pattern therein. For honeycombs utilized in certain filter applications, some cells are designated as inlet cells 108 and some other cells are designated as outlet cells 110. Moreover, in a porous ceramic honeycomb structure 100, at least some of the cells may be plugged with plugs 112 in order to form a filter. Generally, the plugs 112 are arranged at or near the ends of the cell channels and are arranged in some defined pattern, such as in the checkerboard pattern shown in FIG. 1, with every other cell being plugged at an end. The inlet channels 108 may be plugged at or near the second end 104, and the outlet channels 110 may be plugged at or near the first end 102 on channels not corresponding to the inlet channels. Accordingly, each cell may be plugged at or near one end of the porous ceramic honeycomb structure only.

Figure 2:
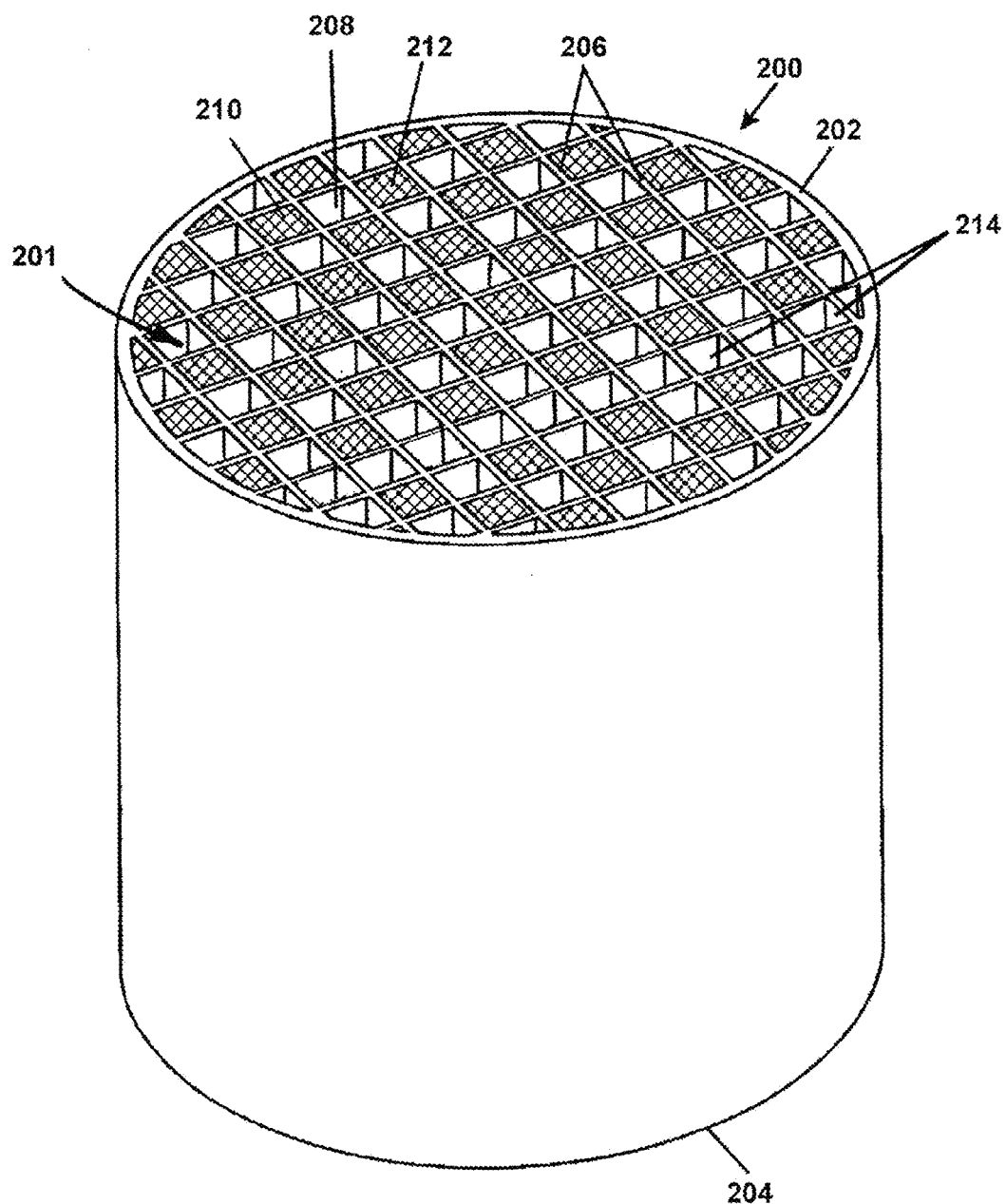
FIG. 2 schematically depicts a porous ceramic honeycomb structure according to one or more embodiments shown and described herein.

Referring now to FIG. 2, an alternative embodiment of a porous ceramic honeycomb structure 200 is schematically depicted. In this embodiment, some cell channels may be flow-through channels (unplugged along their entire length) while other channels may be plugged thus providing a so-called "partial filter" design. More specifically, the porous ceramic honeycomb structure depicted in FIG. 2 generally comprises intersecting porous walls 206, inlet cells 208 plugged with plugs (not shown) at the outlet end 204, outlet cells 210 plugged with plugs 212 at the inlet end and at least some flow through (unplugged) channels 214 where flow passes directly through the body of the porous ceramic honeycomb structure without passing through the porous webs 206. For example, in one embodiment (not shown), every other cell in every other row is a flow through channel. Thus, in this embodiment, less than 50% of the channels may be unplugged.

While FIGS. 1 and 2 depict embodiments of porous ceramic honeycomb structures 100, 200 in which some or all of the channels are plugged, is should be understood that, in alternative embodiments, all the channels of the porous ceramic honeycomb structures may be unplugged, such as when the porous ceramic honeycomb structures 100, 200 are used as catalytic through-flow substrates for use with gasoline engines.

As gas flows to and into the porous ceramic honeycomb structures 100, 200, a pressure build up, or back pressure, may occur as a result of a limited flow area through the porous ceramic honeycomb structure. This back pressure is not desirable and can ultimately lead to damage of the porous ceramic honeycomb structures 100, 200 and/or the system in which the porous ceramic honeycomb structures are included, such as, for example, an exhaust system. Increasing the area of the porous ceramic honeycomb structure 100, 200 through which the gas can flow (e.g., increasing the open space in the grid pattern of porous ceramic honeycomb structures 100, 200) is one way to decrease the back pressure. Forming thin webs 106, 206 is one way to increase the area of the porous ceramic honeycomb structure 100, 200 through which the gas can flow. However, if the webs 106, 206 are formed too thin, the strength of the porous ceramic honeycomb structure 100, 200 will decrease. Embodiments of porous ceramic honeycomb structures and structures disclosed and discussed herein include high porosity, thin webs, and high strength.

In embodiments of the porous ceramic honeycomb structures 100, 200 described herein, the thickness T of the porous webs 106, 206 is thin relative to conventional porous ceramic honeycomb substrates. In some embodiments, an average channel wall thickness is less than or equal to about 150 µm, such as less than or equal to about 130 µm. In other embodiments, an average channel wall thickness is less than or equal to about 110 µm, such as less than or equal to about 100 µm. In still other embodiments, an average channel wall thickness is less than or equal to about 90 µm, such as less than or equal to about 80 µm. In embodiments, an average channel wall thickness is greater than or equal to about 70 µm, such as greater than or equal to about 75 µm. Accordingly, in some embodiments, an average channel wall thickness may be from about 70 µm to about 150 µm, such as from about 75 µm to about 130 µm. In other embodiments, an average channel wall thickness may be from about 80 µm to about 100

In embodiments, the cell density CD of the porous ceramic honeycomb structures 100, 200 may be greater than or equal to about 200 cpsi, such as greater than or equal to about 250 cpsi. In other embodiments, the cell density of the porous ceramic honeycomb structures 100, 200 may be greater than or equal to about 275 cpsi. In yet another embodiment, the cell density of the porous ceramic honeycomb structures 100, 200 may be less than or equal to about 400 cpsi. Accordingly, in some embodiments, the cell density of the porous ceramic honeycomb structures 100, 200 is from greater than or equal to about 200 cpsi to less than or equal to about 400 cpsi, such as from greater than or equal to about 250 cpsi to less than or equal to about 400 cpsi, or from greater than or equal to about 275 cpsi to less than or equal to about 400 cpsi.

The porous ceramic honeycomb structures described herein generally have a relatively high total porosity (% P) as measured with mercury porosimetry. In embodiments of the porous ceramic honeycomb structures described herein, the total porosity % P is greater than or equal to about 55%, such as greater than or equal to about 60%, such as greater than or equal to about 65%. In other embodiments, the total porosity % P is less than or equal to about 75%. In some embodiments, the total porosity is less than or equal to about 80%. In some embodiments, the total porosity % P is from about 60% to about 75%, such as from about 65% to about 75%. In some embodiments, the total porosity % P is from about 55% to about 70%; in other embodiments, the total porosity % P is from about 60% to about 70%; in other embodiments, the total porosity % P is from about 65% to about 70%.

Figure 3:
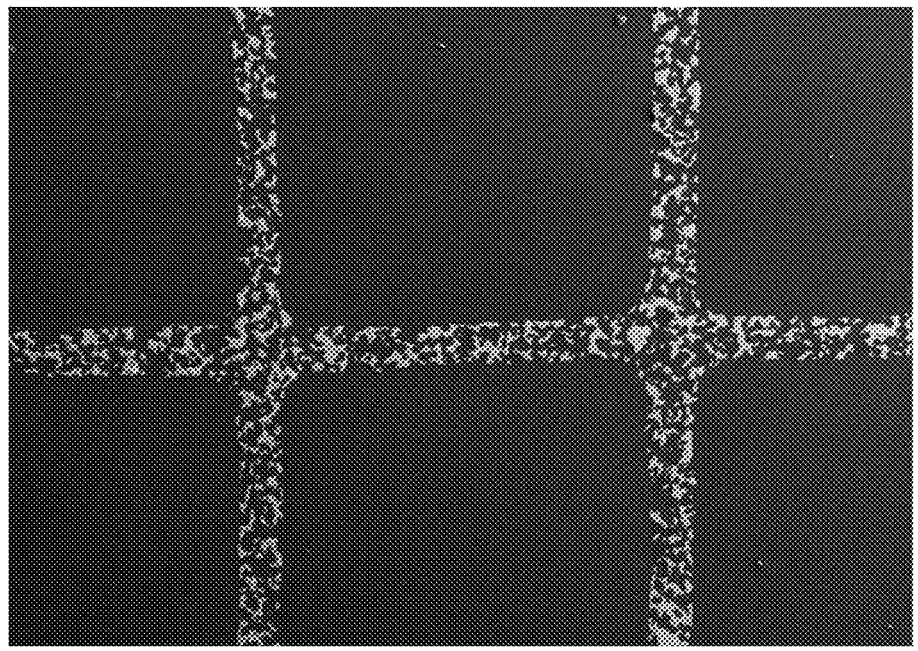
FIG. 3 is an SEM micrograph of a polished cross section of a porous web of a porous ceramic honeycomb structure according to one or more embodiments shown and described herein.
Figure 4:
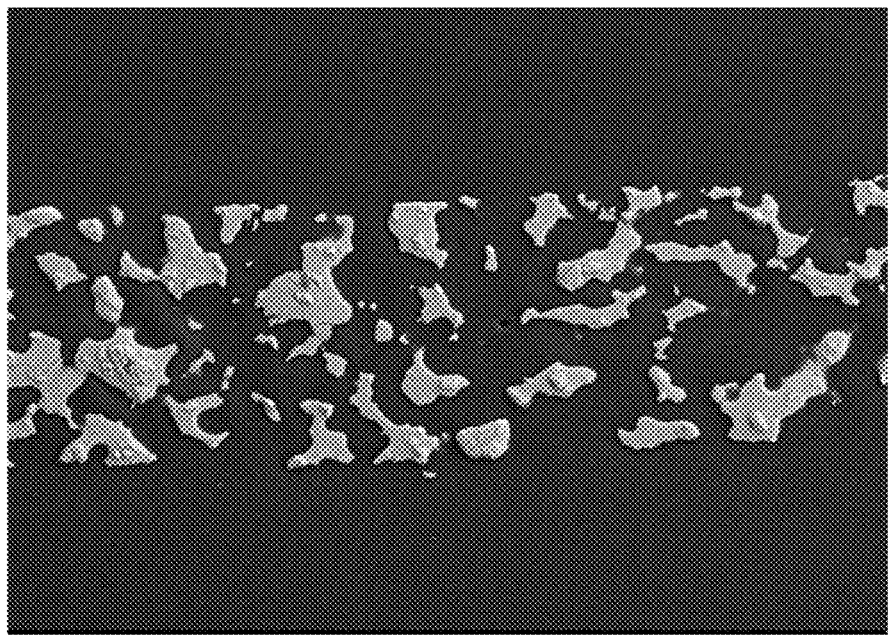
FIG. 4 is an SEM micrograph of a polished cross section of a porous web of a porous ceramic honeycomb structure according to one or more embodiments shown and described herein.
Figure 5:
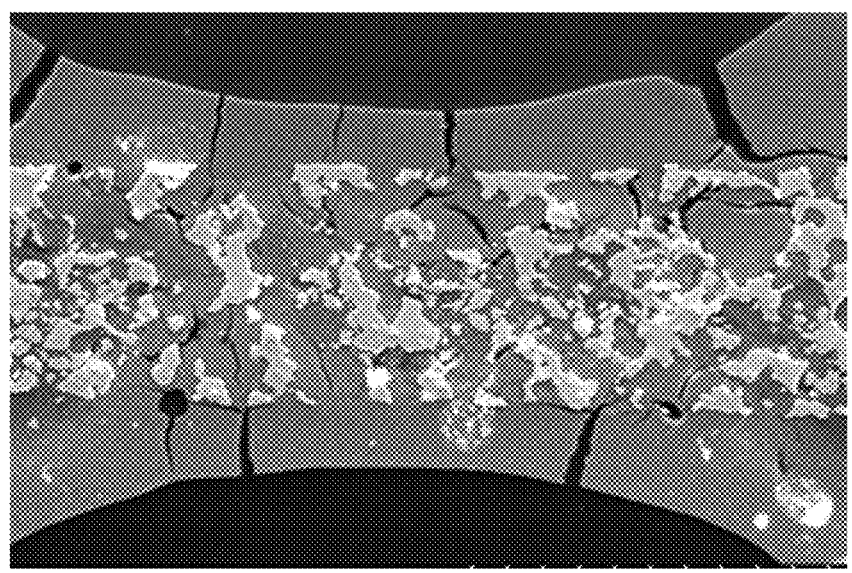
FIG. 5 is an SEM micrograph of a polished cross section of a porous cell web of a porous ceramic honeycomb article coated with a catalyst washcoat according to one or more embodiments shown and described herein.

Referring to FIGS. 3 and 4, the pores of the porous ceramic honeycomb structures are highly connected within the channel-like domains of cordierite ceramic indicating an interpenetrated network structure. Specifically, FIGS. 3 and 4 are SEM micrographs of the pore morphology of a polished axial cross section of a cell web, according to an embodiment, that has an average thickness of approximately 100 µm and a high total porosity. As can be seen in FIGS. 3 and 4, porous ceramic honeycomb structures according to various embodiments disclosed herein preferably have a unimodal pore distribution, particularly with a narrow pore size distribution. As used herein, "unimodal pore distribution" refers to a pore distribution that, when plotted with pore size along a first axis and number of pores along an axis perpendicular to the first axis, has substantially a single peak.

The porous ceramic honeycomb structures described herein generally have a median pore diameter $d_{50}$ greater than or equal to about 10 µm, such as greater than or equal to about 13 µm. In some embodiments, the median pore diameter $d_{50}$ of the porous ceramic honeycomb structure is greater than or equal to about 15 µm, such as greater than or equal to about 20 µm. In yet other embodiments, the median pore diameter $d_{50}$ is greater than or equal to about 25 µm. In some embodiments, the median pore diameter $d_{50}$ is less than or equal to about 50 µm, such as less than or equal to about 45 µm. In other embodiments, the median pore diameter $d_{50}$ is less than or equal to about 40 µm, such as less than or equal to about 30 µm. Accordingly, in embodiments, the median pore diameter $d_{50}$ is from greater than or equal to about 10 µm to less than or equal to about 50 µm, such as from greater than or equal to about 15 µm to less than or equal to about 30 µm, or from greater than or equal to about 15 µm to less than or equal to about 25 µm, or from greater than or equal to about 25 µm to less than or equal to about 35 µm. In other embodiments, the median pore diameter $d_{50}$ is from greater than or equal to about 20 µm to less than or equal to about 30 µm. In yet other embodiments, the median pore diameter $d_{50}$ is from greater than or equal to about 13 µm to less than or equal to about 30 µm. Controlling the porosity such that the median pore diameter $d_{50}$ is within these ranges limits the amount of very small pores, wherein the very small pores can limit washcoat penetration into the ceramic structure, and therefore increases an amount of washcoat disposed in-wall, for example below the outermost surface of the ceramic structure, and decreases an amount of washcoat disposed on-wall, for example above the outermost surface of the ceramic structure, and thereby can minimize the washcoated backpressure of the fired porous ceramic structure.

In the embodiments described herein, the pore size distribution of the porous ceramic honeycomb structure comprises a $d_{10}$ value which is preferably close to $d_{50}$; in some embodiments, $d_{10}$ has a value of greater than or equal to 6 µm or even greater than or equal to 8 µm, or greater than or equal to 10 µm, or even greater than or equal to 12 µm. The quantity $d_{10}$, as used herein, is the pore diameter at which 10% of the pore volume is comprised of pores with diameters smaller than the value of $d_{10}$; thus, using mercury porosimetry techniques to measure porosity, $d_{10}$ is equal to the pore diameter at which 90% by volume of the open porosity of the ceramic has been intruded by mercury during the porosimetry measurement.

As used herein, the d-factor $d_f$ is a characterization of the relative width of the distribution of pore sizes that are finer than the median pore size $d_{50}$. The d-factor $d_f$ is defined as:

$$d_f = (d_{50} - d_{10})/d_{50},$$

where $d_{50}$ and $d_{10}$ are as defined hereinabove. In the embodiments described herein, the pore size distribution of the open interconnected porosity of the porous walls of the porous ceramic honeycomb structure is relatively narrow such that $d_f$ is less than or equal to about 0.45, such as less than or equal to about 0.35. In other embodiments, $d_f$ is less than or equal to about 0.3, such as less than or equal to about 0.25. In some embodiments, $d_f$ is greater than or equal to about 0.05. Accordingly, in embodiments, $d_f$ is from greater than or equal to about 0.05 to less than or equal to about 0.45, such as from greater than or equal to about 0.05 to less than or equal to about 0.35. In other embodiments, $d_f$ is from greater than or equal to about 0.05 to less than or equal to about 0.3, such as from greater than or equal to about 0.05 to less than or equal to about 0.25.

In the embodiments described herein, the porous ceramic honeycomb structure has a pore size distribution with a $d_{90}$ value of less than or equal to 60 µm, such as less than or equal to 55 microns. In various embodiments, having higher $d_{90}$ values is indicative of larger pores, which can compromise or limit the overall strength of a wall or the entire honeycomb structure. Some embodiments of the porous ceramic honeycomb structures have a pore size distribution with a $d_{90}$ value of less than or equal to 45 microns. The quantity $d_{90}$, as used herein, is the pore diameter at which 90% of the pore volume is comprised of pores with diameters smaller than the value of $d_{90}$; thus, using mercury porosimetry techniques to measure porosity, $d_{90}$ is equal to the pore diameter at which 10% by volume of the open porosity of the ceramic has been intruded by mercury during the porosimetry measurement.

Further, in some embodiments, the ceramic honeycomb structure has ceramic walls with a pore structure that does not include any individual pores with an inscribed circle that is greater than the channel wall thickness. As used herein, an inscribed circle is a hypothetical circle drawn within a pore where all sides of the pore on the same plane as the inscribed circle are tangential to the inscribed circle.

Further, it has now been found that the combination of the total porosity, the median pore diameter $d_{50}$, and the d-factor $d_f$ described herein generally provide a porous ceramic honeycomb structure which can be readily coated with a significant amount of washcoat in a single washcoating step, thus exhibiting a unique accessibility of the pore space provided within the porous ceramic honeycomb. In embodiments, the washcoat is present in the porous ceramic honeycomb structure such that the washcoat fills at least about 50% of a pore volume of the porous ceramic honeycomb structure. In other embodiments, the washcoat is present in the porous ceramic honeycomb structure such that the washcoat fills at least about 55% of a pore volume of the porous ceramic honeycomb structure. In still other embodiments, the washcoat is present in the porous ceramic honeycomb structure such that the washcoat fills at least about 60% of a pore volume of the porous ceramic honeycomb structure. In yet other embodiments, the washcoat is present in the porous ceramic honeycomb structure such that the washcoat fills at least about 65% of a pore volume of the porous ceramic honeycomb structure. In embodiments, the washcoat is present in the porous ceramic honeycomb structure such that the washcoat fills from greater than or equal to about 50% of a pore volume of the porous ceramic honeycomb structure to less than or equal to about 95% of a pore volume of the porous ceramic honeycomb structure. In other embodiments, the washcoat is present in the porous ceramic honeycomb structure such that the washcoat fills from greater than or equal to about 55% of a pore volume of the porous ceramic honeycomb structure to less than or equal to about 90% of a pore volume of the porous ceramic honeycomb structure. In still other embodiments, the washcoat is present in the porous ceramic honeycomb structure such that the washcoat fills from greater than or equal to about 60% of a pore volume of the porous ceramic honeycomb structure to less than or equal to about 85% of a pore volume of the porous ceramic honeycomb structure.

Further, the high density of uniformly distributed and well connected pores, such as those shown in FIGS. 3 and 4, allows for a greater amount of catalyst to be washcoated into the porous ceramic structure while still maintaining the permeability of the porous ceramic article to gas, such as exhaust gases, which flow through the porous ceramic article. Similarly, because the porous ceramic structure has a narrow pore size distribution with a relatively small median pore size, the pores have a high microcapillary force which assists in retaining the catalyst in the pores. Accordingly, the catalyst deposited in the pores during washcoating with the washcoat is not easily dislodged from the pores during high-volume flow of gas through the porous ceramic article compared to porous ceramic articles having larger median pore sizes and broader pore size distributions.

In addition, the porous ceramic honeycomb structures and articles described herein have a set of physical properties (e.g., coefficient of thermal expansion (CTE), thermal shock limit (TSL), strength (MOR/CFA), etc.) which provide an indication that the structures and articles suitable for use at elevated temperatures, such as those temperatures of experienced in the exhaust system of a vehicle. It should be understood that CTE, as used herein, is the coefficient of thermal expansion in at least one direction of the structure over the specified temperature range, unless otherwise specified.

Thermal Shock Limit (TSL), as used herein, is defined as:

$$TSL = TSP + 500°\ C.,$$

where TSP is the Thermal Shock Parameter such that:

$$TSP = \frac{MOR}{\{[E_{mod}][CTE_H]\}}$$

$E_{mod}$ is the elastic modulus of the structure at 25° C. (i.e., room temperature (RT)), MOR is the modulus of rupture strength at room temperature and is measured in psi, and $CTE_H$ is the high temperature thermal expansion coefficient measured between 500° C. and 900° C. As the TSP increases, the ability of the structure to withstand thermal gradients also increases. MOR, $E_{mod}$, and $C_{TEH}$ are all measured on a cellular specimen parallel to the length of the channels which is referred to herein as the axial direction. MOR was measured using the four point bend method in the axial direction of a rectangular cellular bar having dimensions of 4×1×0.5 inches.

In some in embodiments, the CTE is from about $2.0×10^{-7}/°$ C. to about $25×10^{-7}/°$ C., such as from about $4.0×10^{-7}/°$ C. to about $20×10^{-7}/°$ C., and in some embodiments CTE>$10×10^{-7}/°$ C., in some embodiments CTE is between about $10×10^{-7}/°$ C. and about $20×10^{-7}/°$ C., and in some embodiments from about $12×10^{-7}/°$ C. to about $21×10^{-7}/°$ C. In other embodiments, the porous ceramic honeycomb structures and articles have a CTE from about $5.0×10^{-7}/°$ C. to about $18×10^{-7}/°$ C. Unless otherwise noted specifically, CTE is RT to 800 C. In some embodiments, the porous ceramic honeycomb structures and articles have a CTE measured between room temperature and 800° C. that is greater than or equal to about $0.5(d_{50}-5.0)$, where CTE is expressed as $10^{-7}/°$ C. In some embodiments described herein, the porous ceramic honeycomb structures and articles have a Thermal Shock Limit (TSL) greater than about 1000° C., and in some embodiments in the range from about 1000° C. to about 1550° C.

The strength of the porous ceramic honeycomb structures and articles disclosed herein can be measured with the modulus of rupture (MOR) normalized by the closed frontal area (CFA) of the porous ceramic honeycomb structures and articles. The term modulus of rupture (MOR) refers to the axial flexural strength of the porous ceramic honeycomb structure. MOR is measured using a four-point method on a cellular bar cut parallel to the lengths of the channels of the porous ceramic honeycomb structure. The term closed frontal area (CFA) refers to the fractional area occupied by the porous channel walls in a cross section orthogonal to the lengths of the cell channels. For a given bulk density of the porous ceramic honeycomb structure, the CFA can be calculated according to the equation:

$$CFA = \frac{\text{bulk density}}{\{2.51 \times [1 - (\% P/100)]\}}$$

in which the bulk density is in units of g/cm$^3$ and % P is the porosity of the porous ceramic honeycomb structure. In other instances, the CFA may be calculated according to the relation:

$$CFA = (w)(N)[2N^{-0.5} - w]$$

where w is the wall thickness of the porous ceramic honeycomb structure in units of inches and N is the cell density in units of in$^{-2}$.

In the embodiments disclosed herein, sufficiently high strength (for example, high MOR/CFA) of the porous cordierite ceramic bodies is provided while providing thin walls, high porosity, and coarse pores. The value MOR/CFA is proportional to the strength of the ceramic comprising the wall of the porous ceramic honeycomb structure. In some embodiments described herein, the value of MOR/CFA before and after washcoating and calcination (i.e., the as-fired MOR/CFA value and the coated MOR/CFA value) are greater than or equal to about 900 psi, such as greater than or equal to about 1000 psi. In other embodiments the MOR/CFA value and the coated MOR/CFA value are greater than or equal to about 1200 psi, such as greater than or equal to about 1500 psi. In still other embodiments the as-fired MOR/CFA value and the coated MOR/CFA value are greater than or equal to about 1800 psi, such as greater than or equal to about 2000 psi. In embodiments, the as-fired MOR/CFA value and the coated MOR/CFA value are less than or equal to about 3000 psi. Accordingly, in embodiments, the as-fired MOR/CFA value and the coated MOR/CFA value are from greater than or equal to about 900 psi to less than or equal to about 3000 psi, such as from greater than or equal to about 1000 psi to less than or equal to about 3000 psi. In other embodiments, the as-fired MOR/CFA value and the coated MOR/CFA value are from greater than or equal to about 1200 psi to less than or equal to about 3000 psi, such as from greater than or equal to about 1500 psi to less than or equal to about 3000 psi. In yet other embodiments, the as-fired MOR/CFA value and the coated MOR/CFA value are from greater than or equal to about 1800 psi to less than or equal to about 3000 psi, such as from greater than or equal to about 2000 psi to less than or equal to about 3000 psi.

The porous ceramic honeycomb structures and articles described herein are formed by first mixing a precursor batch composition, forming the precursor batch composition into a green honeycomb body, drying the green honeycomb body and firing the green honeycomb body under conditions suitable to produce a low microcracked porous ceramic honeycomb structure. In embodiments, after the green honeycomb structure is fired to form a porous ceramic honeycomb structure, the porous ceramic honeycomb structure may be washcoated with a catalyst-containing washcoat to form a coated porous ceramic honeycomb article. Because the porous ceramic honeycomb structure has relatively few microcracks, a separate passivation coating is not needed prior to application of the washcoat.

The porous ceramic honeycomb structures and articles disclosed herein comprise cordierite porous ceramic honeycomb structures and articles. In such embodiments, the cordierite precursor batch composition comprises a combination of constituent materials suitable for producing a ceramic structure which predominately comprises a cordierite crystalline phase. In general, the batch composition comprises a combination of inorganic components comprising magnesia-forming source particles (such as talc), silica-forming source particles, and alumina-forming source particles; in some embodiments, spinel particles can serve as a source of magnesia and alumina; preferably all inorganic component particles are fine sized. In still other embodiments the batch composition may comprise clay, such as, for example, kaolin clay. The cordierite precursor batch composition preferably contains one or more organic components such as one or more organic pore formers. For example, the batch composition may comprise one or more types of starch which is suitable for use as a pore former and/or other processing aids. In some embodiments described herein, the organic pore former comprises at least two different organic pore former materials. In other embodiments described herein, the organic pore former comprises a single material as opposed to a mixture of different organic materials thereby reducing the number of constituent materials in the cordierite precursor batch composition.

In the embodiments described herein, the inorganic batch components and the organic batch components are selected in conjunction with a specific firing cycle so as to yield a porous ceramic honeycomb structure comprising a predominant cordierite crystalline phase, such as with a specific microstructure. However, it should be understood that, after firing, the porous ceramic honeycomb structure may also include amounts of mullite, spinel, and/or mixtures thereof; additionally, the ceramic honeycomb structure comprises an amorphous phase, such as a glass phase, which in some embodiments is greater than 3%, and in some embodiments is less than 20%, and in some embodiments is less than 15%, and in some embodiments is between 5% and 15%. In some embodiments the porous ceramic honeycomb structure may comprise greater than or equal to 80% by weight, such as at least 90% by weight of the article, as measured by x-ray diffraction. The cordierite crystalline phase produced comprises, as characterized in an oxide weight percent basis, from about 49% to about 53% by weight $SiO_2$, from about 33% to about 38% by weight $Al_2O_3$, and from about 12% to about 16% by weight MgO. Moreover, the cordierite crystalline phase stoichiometry approximates $Mg_2Al_4Si_5O_{18}$. The inorganic cordierite precursor batch composition may be appropriately adjusted to achieve the aforementioned oxide weights within the cordierite crystalline phase of the porous ceramic honeycomb structure.

In some embodiments described herein, the cordierite precursor batch compositions comprise a magnesia source, preferably two magnesia sources such as a talc and magnesium aluminate spinel; in some embodiments from about 20% to about 30% by weight of talc. In other embodiments, the cordierite precursor batch composition may comprise from about 38% to about 43% by weight of talc. The talc may have a relatively fine particle size. For example, in some embodiments, the talc has a median particle diameter $d_{pt50}$ of less than or equal to about 10 µm, or even a $d_{pt50}$ of less than or equal to about 9 µm. In other embodiments, the talc has a median particle diameter $d_{pt50}$ less than or equal to about 8 µm or even a $d_{pt50}$ less than or equal to about 6 µm. In still other embodiments the talc may have a median particle size $d_{pt50}$ of less than or equal to about 5 µm. In one exemplary embodiment, the talc has a median particle size $d_{pt50}$ in the range from greater than or equal to about 3 µm to less than or equal to about 10 µm. In another exemplary embodiment, the talc has a median particle size $d_{pt50}$ in the range from greater than or equal to about 8 µm to less than or equal to about 10 µm. All particle sizes described herein are measured by a particle size distribution (PSD) technique, preferably by a Sedigraph by Micrometrics.

In some embodiments, the amount of the silica-forming source in the cordierite precursor batch composition is from about 13% to about 24% by weight. In other embodiments, the amount of the silica-forming source in the cordierite precursor batch composition may be from about 15% to about 18% by weight. The silica-forming source generally has a fine particle size. For example, in some embodiments, the silica-forming source has a median particle diameter $d_{ps50}$ of less than or equal to about 10 µm, or even a $d_{ps50}$ of less than or equal to about 9 µm. In other embodiments, the silica-forming source has a median particle diameter $d_{ps50}$ less than or equal to about 8 microns. In embodiments, the silica-forming source is a microcrystalline silica such as Imsil® A-25. However, it should be understood that other silica-forming sources may be used. For example, other suitable silica-forming sources include fused silica; colloidal silica; or crystalline silica such as quartz or crystobalite.

In some embodiments, the amount of the alumina-forming source in the cordierite precursor batch composition is from about 20% to about 35% by weight while in other embodiments the amount of the alumina-forming source in the cordierite precursor batch composition is from about 22% to about 33% by weight. In still other embodiments the amount of the alumina forming source in the cordierite precursor batch composition is from about 26% to about 29% by weight. The alumina-forming source generally has a fine particle size. For example, in some embodiments, the alumina-forming source has a median particle diameter $d_{pa50}$ of less than or equal to about 10 µm, or even a $d_{pa50}$ of less than or equal to about 8 µm. In other embodiments, the silica-forming source has a median particle diameter $d_{pa50}$ less than or equal to about 6 µm.

Exemplary alumina-forming sources may include any aluminum oxide or a compound containing aluminum which, when heated to a sufficiently high temperature, yields essentially 100% aluminum oxide, such as alpha-alumina and/or hydrated alumina. Further non-limiting examples of alumina-forming sources include corundum, gamma-alumina, or transitional alumina. The aluminum hydroxide may comprise gibbsite and bayerite, boehmite, diaspore, aluminum isopropoxide, and the like. If desired, the alumina-forming source may also comprise a dispersible alumina-forming source. As used herein, a dispersible alumina-forming source is one that is at least substantially dispersible in a solvent or liquid medium and that can be used to provide a colloidal suspension in a solvent or liquid medium. In one aspect, a dispersible alumina-forming source can be a relatively high surface area alumina source having a specific surface area of at least 20 m²/g, at least 50 m₂/g, or even at least 100 m²/g. A suitable dispersible alumina source comprises alpha aluminum oxide hydroxide (AlOOH·x·H₂O) commonly referred to as boehmite, pseudoboehmite, and as aluminum monohydrate. In alternative embodiments, the dispersible alumina source can comprise the so-called transition or activated aluminas (i.e., aluminum oxyhydroxide and chi, eta, rho, iota, kappa, gamma, delta, and theta alumina) which can contain various amounts of chemically bound water or hydroxyl functionalities.

In some embodiments, the cordierite precursor batch composition may further comprise clay. The amount of clay in the cordierite precursor batch composition may be from about 0% to about 20% by weight. In another embodiment, the amount of clay in the cordierite precursor batch composition is from about 10% to about 18% by weight or even from about 12% to about 16% by weight. When included in the cordierite batch composition, the clay generally has a median particle size $d_{pc50}$ of less than or equal to about 10 microns. In some embodiments, the median particle size $d_{pc50}$ is less than or equal to about 5 microns or even less than or equal to about 3 microns. Suitable clays which may be included in the cordierite precursor batch composition include, without limitation, raw kaolin clay, calcined kaolin clay, and/or mixtures thereof. Exemplary and non-limiting clays include non-delaminated kaolinite raw clay and delaminated kaolinite.

In embodiments described herein, the inorganic components of the cordierite batch composition (i.e., talc, silica, alumina and clay) have a median particle size $d_{50IP}$ less than or equal to about 10 µm, such as less than or equal to about 8 µm. In other embodiments, the inorganic components of the cordierite batch composition have a median particle size $d_{50IP}$ less than or equal to about 7 µm, such as less than or equal to about 6 µm. In still other embodiments, the inorganic components of the cordierite batch composition have a median particle size $d_{50IP}$ less than or equal to about 5 µm, such as less than or equal to about 4 µm. Accordingly, in embodiments, the inorganic components of the cordierite batch composition have a median particle size $d_{50IP}$ from greater than or equal to about 4 µm to less than or equal to about 10 µm, such as from greater than or equal to about 5 µm to less than or equal to about 9 µm. In other embodiments, the inorganic components of the cordierite batch composition have a median particle size $d_{50IP}$ from greater than or equal to about 6 µm to less than or equal to about 8 µm.

As described herein above, the cordierite precursor batch composition further comprises organic components such as starch-based pore formers. In embodiments, a starch-based pore former is added to the batch composition in an amount sufficient to create a relatively high pore number density with a relatively small median pore size and a relatively narrow pore size distribution. In embodiments, the cordierite precursor batch composition comprises greater than or equal to about 20% by weight, such as greater than or equal to about 30% by weight of an starch-based pore former as superaddition with respect to the weight of 100% of the inorganic batch ingredients. In some embodiments, the amount of starch-based pore former added to the batch composition is up to about 60% by weight. In other embodiments, the amount of starch-based pore former added to the batch composition is from greater than or equal to about 20% to less than or equal to about 60% by weight, such as from greater than or equal to about 30% to less than or equal to about 60%. In other embodiments, the amount of starch-based pore former added to the batch composition is from greater than or equal to about 40% to less than or equal to about 60% by weight, such as from greater than or equal to about 40% to less than or equal to about 50% by weight. It should be understood that, increasing the amount of pore former in the batch composition increases the pore number density of the porous ceramic honeycomb structure after firing.

In embodiments the starch-based pore former generally has a median particle size $d_{pp50}$ greater than or equal to about 10 μm. In some embodiments, the organic pore former has a median particle size $d_{pp50}$ greater than or equal to about 12 μm, such as greater than or equal to about 15 μm. In other embodiments, the median particle size $d_{pp50}$ is greater than or equal to about 17 μm, such as greater than or equal to about 20 μm. In still other embodiments, the median particle size $d_{pp50}$ is greater than or equal to about 25 μm, such as greater than or equal to about 30 μm. In still other embodiments, the median particle size $d_{pp50}$ is greater than or equal to about 35 μm, such as greater than or equal to about 40 μm. In embodiments, the median particle size $d_{pp50}$ is less than or equal to about 50 μm. Accordingly, in embodiments, the median particle size $d_{pp50}$ is from greater than or equal to about 10 μm to less than or equal to about 50 μm, such as from greater than or equal to about 12 μm to less than or equal to about 50 μm. In other embodiments, the median particle size $d_{pp50}$ is from greater than or equal to about 15 μm to less than or equal to about 50 μm, such as from greater than or equal to about 17 μm to less than or equal to about 50 μm. In still other embodiments, the median particle size $d_{pp50}$ is from greater than or equal to about 20 μm to less than or equal to about 50 μm. In yet other embodiments, the median particle size $d_{pp50}$ is from greater than or equal to about 25 μm to less than or equal to about 50 μm, such as from greater than or equal to about 30 μm to less than or equal to about 50 μm. In further embodiments, the median particle size $d_{pp50}$ is from greater than or equal to about 35 μm to less than or equal to about 50 μm, such as from greater than or equal to about 40 μm to less than or equal to about 50 μm. The starch-based pore former may be a cross-linked pore former (i.e., cross-linked starches and the like) or un-cross-linked pore former. Examples of suitable pore forming materials include, without limitation, cross-linked and uncross-linked corn starch, wheat starch, potato starch, green bean starch, pea starch, and combinations thereof.

In some embodiments, to decrease the amount of microcracking, magnesium aluminate spinel is added to the composition. Without being bound to any particular theory, it is believed that the magnesium aluminate spinel leads to a small cordierite domain size, which leads to a microstructure that is substantially free from microcracks. In some embodiments, the precursor batch composition comprises greater than about 15% by weight spinel, or preferably greater than or equal to about 20% by weight spinel, in some embodiments greater than or equal to about 25% by weight spinel, or in some embodiments greater than or equal to about 30% by weight spinel. In other embodiments, the precursor batch composition comprises greater than or equal to about 35% by weight spinel. In some embodiments, the batch composition comprises less than or equal to about 40% by weigh spinel. In some embodiments, the batch composition comprises from greater than or equal to about 25% by weight spinel to about 40% by weight spinel, such as from greater than or equal to about 25% by weight spinel to less than or equal to about 35% by weight spinel.

The inorganic and organic components described above are combined and mixed together with processing aids such as, for example, a binder, and a liquid vehicle, to create a plasticized batch mixture. These processing aids may improve processing and/or reduce drying and/or firing cracking and/or aid in producing desirable properties in the honeycomb structure. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. In some embodiments, the organic binder is present in the composition as a super addition in an amount in the range of from about 0.1% to about 10.0% by weight of the inorganic powder batch composition. In some of these embodiments, the organic binder is present in the composition as a super addition in an amount in the range of from about 2.0% to about 8.0% by weight of the inorganic powder batch composition. Incorporation of the organic binder into the plasticized batch composition allows the plasticized batch composition to be readily extruded.

One liquid vehicle for providing a flowable or paste-like consistency to the batch composition is water, although it should be understood that other liquid vehicles exhibiting solvent action with respect to suitable temporary organic binders can be used. The amount of the liquid vehicle component can vary in order to impart optimum handling properties and compatibility with the other components in the batch composition. In some embodiments, the liquid vehicle content is present as a super addition in an amount in the range from about 20% to about 50% by weight, and in other embodiments in the range from about 20% to about 35% by weight. Minimization of liquid components in the batch composition can lead to further reductions in undesired drying shrinkage and crack formation during the drying process.

In addition to the liquid vehicle and binder, the plasticized batch composition may include one or more optional forming or processing aids such as, for example, a lubricant. Exemplary lubricants can include tall oil, sodium stearate or other suitable lubricants. The amount of lubricant present in the plasticized batch mixture may be from about 0.5% by weight to about 10% be weight.

It should be understood that the liquid vehicle, pore formers, binders, lubricants and any other processing aids included in the batch composition are added to the batch composition as super additions based upon the weight % of 100% of the inorganic materials.

The combination of inorganic batch components, pore formers, binders, the liquid vehicle, lubricants and any other additives are mixed together in a Littleford mixer or the like and kneaded for approximately 5-20 minutes to produce a plasticized batch composition having the desired plastic formability and green strength to permit the plasticized batch composition to be shaped into a honeycomb structure.

The resulting plasticized cordierite precursor batch composition is then shaped into a green body by conventional ceramic forming processes, such as, for example, extrusion. When the green honeycomb body is formed by extrusion, the extrusion can be performed using a hydraulic ram extrusion press, or alternatively, a two stage de-airing single auger extruder, or a twin screw mixer with a die assembly attached to the discharge end.

After the plasticized cordierite precursor batch composition has been formed into a green honeycomb body, the green honeycomb body is dried to remove excess liquid from the green honeycomb body. Suitable drying techniques include microwave drying, hot air drying, RF drying or various combinations thereof. After drying, the green honeycomb body is placed in a kiln or furnace and fired under conditions effective to convert the green honeycomb body into a ceramic honeycomb structure comprising a primary cordierite crystalline phase.

It should be understood that the firing conditions utilized to convert the green honeycomb body into a ceramic honeycomb structure can vary depending on the process conditions such as, for example, the specific composition, size of the green honeycomb body, and nature of the equipment used. To that end, in one aspect, the optimal firing conditions specified herein may be adapted (i.e., slowed down) for very large cordierite structures, for example. Firing conditions are known for desired uses and sizes of porous ceramic honeycomb structures and articles.

In some embodiments described herein, the porous ceramic honeycomb structures are washcoated with a catalyst washcoat after firing. For example, a slurry of a particulate catalyst washcoating composition can be applied to the surfaces (both internal and external) of the porous ceramic honeycomb structure. For example, in the embodiments described herein, the catalyst washcoat has a catalytic function that promotes catalytic reactions involving the reduction of NOx and/or the oxidation of CO, hydrocarbons, and NO in an exhaust gas stream which is directed through the porous ceramic honeycomb article. Thus, it should be understood that, in addition to acting as a particulate filter, the porous ceramic honeycomb articles described herein may also exhibit catalyst functionalities and, as such, may be utilized as a 4-way filter deNOx integrated filter (NIF).

In some embodiments, the primary particulate component of the washcoating slurry is alumina. In other embodiments, the primary particulate component is a zeolite, such as Fe-ZSM-5 which may be incorporated in water in an amount from about 7 wt. % to about 12 wt. % to form a catalyst washcoat slurry. However, it should be understood that, in other embodiments, the catalyst washcoat may comprise a different primary particulate component. In some embodiments, the catalyst washcoat may additionally comprise a particulate catalyst such as, by way of example and not limitation, platinum, palladium, rhodium, or any other catalytic material and/or various alloys thereof.

Because the porous ceramic honeycomb structure contains relatively few microcracks per unit volume (i.e., because the microcrack parameter $Nb^3$ is from about 0.04 to about 0.25), it is not necessary to apply a preliminary passivation coating to the porous ceramic honeycomb structure to prevent the washcoating material from becoming lodged in the microcracks, as is the case for more highly microcracked structures.

EXAMPLES

Embodiments will be further clarified by the following examples.

Examples

Examples 1-25 are porous ceramic honeycomb structures made in accordance with embodiments disclosed and described herein. The precursor batch compositions and firing cycles are as indicated in Table 1. The firing cycle row in Table 1 lists "ramp>1200° C./ramp T/ramp time," which indicates the ramp rate in ° C./hr from 1200° C. to the soak temperature, the soak temperature, and the time (in hours) the porous ceramic honeycomb structures is held at the soak temperature. In addition, properties of the exemplary porous ceramic honeycomb structures, such as MOR, normalized MOR, strain tolerance, TSP, etc. are provided in Table 1.

TABLE 1

|  | EX. 1 | EX. 2 | EX. 3 | EX. 4 | EX. 5 | EX. 6 |
|---|---|---|---|---|---|---|
| Raw Materials |  |  |  |  |  |  |
| Fcor Talc |  | 23.47 |  |  |  |  |
| JF500 talc |  |  | 23.47 | 23.47 |  | 23.47 |
| JF150 Talc |  |  |  |  |  |  |
| 96-67 Talc | 23.47 |  |  |  | 23.47 |  |
| Spinel 25 (5 μm) | 25 | 25 | 25 | 25 | 25 | 25 |
| HVA Alumina | 9.4 | 9.4 | 9.34 | 9.34 | 9.34 | 9.34 |
| A3000 Alumina |  |  |  |  |  |  |
| Aluminum trihydrate |  |  |  |  |  |  |
| CHC-94 Kaolin |  |  |  |  |  |  |
| FHC Kaolin | 16 | 16 | 16 | 16 | 16 | 16 |
| CSG-04 Kaolin |  |  |  |  |  |  |
| Imsil A-25 | 26.12 | 26.12 | 26.12 | 26.12 | 26.12 | 26.12 |
| Bentonitie CH-325 |  | 2.5 |  | 2.5 | 1 | 1 |
| Walnutshell flour-325 | 20 | 30 | 30 |  |  |  |
| Potato Starch - CLS |  |  |  | 48.3 | 40 | 48.3 |
| XL Potato Starch |  |  |  |  |  |  |
| XL Pea Starch |  |  |  |  |  |  |
| XL Corn Starch |  |  |  |  |  |  |
| Asbury A-625 Graphite |  |  |  |  |  |  |
| Asbury A99 Graphite |  |  |  |  |  |  |
| Asbury 4602 Graphite | 20 | 30 | 30 | 21.2 | 20 | 21.2 |
| Asbury 4014 graphite |  |  |  |  |  |  |
| F240 Methocel | 6 | 6 | 6 | 6 | 6 | 6 |
| Sodium Stearate | 1 | 1 | 1 | 1 | 1 | 1 |
| Firing Cycle |  |  |  |  |  |  |
| ramp >1200° C./soak T/soak time | 15/1409/11 | 25/1415/10 | 50/1412/10 | 50/1412/10 | 50/1415/15 | 25/1405/10 |
| Properties |  |  |  |  |  |  |
| CTE ($\times 10^{-7}$ °C.$^{-1}$) RT-800° C. | 15.0 | 17.1 | 16.2 | 16.7 | 14.3 | 15.2 |
| CTE ($\times 10^{-7}$ °C.$^{-1}$) 500-900° C. | 21.7 | 23.4 | 22.4 | 23.1 | 20.7 | 22 |
| MOR (psi) | 469 | 550 | 482 | 294 | 564 | 293 |

TABLE 1-continued

| | | | | | | |
|---|---|---|---|---|---|---|
| MOR (normalized to solid rod) | 1968 | 2220 | 1946 | 1187 | 2277 | 1229 |
| E (Mpsi) | 0.32 | 0.28 | 0.24 | 0.18 | 0.26 | 0.17 |
| Strain tolerance (%) | 0.15 | 0.20 | 0.20 | 0.16 | 0.22 | 0.17 |
| TSP ($MOR_{RT}/(E_{RT}*CTE_{500-900})$) | 675 | 839 | 897 | 707 | 1048 | 783 |
| TSL | 1175 | 1339 | 1397 | 1207 | 1548 | 1283 |
| Porosity (%) | 61.3 | 63.3 | 65 | 70 | 69 | 69.5 |
| d10 | 7.3 | 11.9 | 11.9 | 18.3 | 15.1 | 13.2 |
| d50 | 12.3 | 16.7 | 16.7 | 25.8 | 21.5 | 21.0 |
| d90 | 20.3 | 28.6 | 27.4 | 48.2 | 36.5 | 40.2 |
| $d_f$ | 0.41 | 0.29 | 0.29 | 0.29 | 0.30 | 0.37 |
| $d_b$ | 1.06 | 1.00 | 0.93 | 1.16 | 1.00 | 1.29 |
| PCF | 58.00 | 63.30 | 70.03 | 60.40 | 69.32 | 54.06 |

| | EX. 7 | EX. 8 | EX. 9 | EX. 10 | EX. 11 |
|---|---|---|---|---|---|
| Raw Materials | | | | | |
| Fcor Talc | | | | | |
| JF500 talc | 23.47 | 23.47 | 23.47 | 23.47 | 23.47 |
| JF150 Talc | | | | | |
| 96-67 Talc | | | | | |
| Spinel 25 (5 μm) | 25 | 25 | 25 | 25 | 25 |
| HVA Alumina | 9.34 | 9.34 | 9.34 | 9.34 | 9.34 |
| A3000 Alumina | | | | | |
| Aluminum trihydrate | | | | | |
| CHC-94 Kaolin | | | | | |
| FHC Kaolin | 16 | 16 | 16 | 16 | 16 |
| CSG-04 Kaolin | | | | | |
| Imsil A-25 | 26.12 | 26.12 | 26.12 | 26.12 | 26.12 |
| Bentonitie CH-325 | 1 | 1 | 1 | 1 | 1 |
| Walnutshell flour-325 | | | | | |
| Potato Starch - CLS | 60 | 60 | 50 | 48.3 | 48.3 |
| XL Potato Starch | | | | | |
| XL Pea Starch | | | | | |
| XL Corn Starch | | | | | |
| Asbury A-625 Graphite | | | | | |
| Asbury A99 Graphite | | | | | |
| Asbury 4602 Graphite | 30 | 30 | | 21.2 | 21.2 |
| Asbury 4014 graphite | | | | | |
| F240 Methocel | 6 | 6 | 6 | 6 | 6 |
| Sodium Stearate | 1 | 1 | 1 | 1 | 1 |
| Firing Cycle | | | | | |
| ramp >1200° C./soak T/soak time | 50/1420/15 | 75/1405/2 | 50/1415/10 | 75/1405/10 | 5/1405/10 |
| Properties | | | | | |
| CTE ($\times 10^{-7}$ °C.$^{-1}$) RT-800° C. | 13.9 | 21.3 | 16 | 18 | 12.4 |
| CTE ($\times 10^{-7}$ °C.$^{-1}$) 500-900° C. | 20 | 27.2 | 22.3 | 23.8 | 19.3 |
| MOR (psi) | 534 | 273 | 328 | 326 | 372 |
| MOR (normalized to solid rod) | 2156 | 1102 | 1376 | 1050 | 1198 |
| E (Mpsi) | 0.4 | 0.11 | 0.2 | 0.19 | 0.24 |
| Strain tolerance (%) | 0.13 | 0.25 | 0.16 | 0.17 | 0.16 |
| TSP ($MOR_{RT}/(E_{RT}*CTE_{500-900})$) | 668 | 912 | 735 | 721 | 803 |
| TSL | 1168 | 1412 | 1235 | 1221 | 1303 |
| Porosity (%) | 67.2 | 70.6 | 66.8 | 70.5 | 67.7 |
| d10 | 18.6 | 20.1 | 18.2 | 18.2 | 10.1 |
| d50 | 25.2 | 27.2 | 26.7 | 26.8 | 18.3 |
| d90 | 45.1 | 48.3 | 48.3 | 41 | 30.9 |
| $d_f$ | 0.26 | 0.26 | 0.32 | 0.32 | 0.45 |
| $d_b$ | 1.05 | 1.04 | 1.13 | 0.85 | 1.14 |
| PCF | 63.90 | 68.10 | 59.25 | 82.87 | 59.56 |

| | EX. 12 | EX. 13 | EX. 14 | EX. 15 | EX. 16 |
|---|---|---|---|---|---|
| Raw Materials | | | | | |
| Fcor Talc | | | | | |
| JF500 talc | 23.47 | 23.47 | 23.25 | 23.25 | 23.25 |
| JF150 Talc | | | | | |
| 96-67 Talc | | | | | |
| Spinel 25 (5 μm) | 25 | 25 | 24.77 | 24.77 | 24.77 |
| HVA Alumina | 9.34 | 9.34 | 9.25 | 9.25 | 9.25 |
| A3000 Alumina | | | | | |
| Aluminum trihydrate | | | | | |
| CHC-94 Kaolin | | | | | |
| FHC Kaolin | 16 | 16 | 15.85 | 15.85 | 15.85 |
| CSG-04 Kaolin | | | | | |
| lmsil A-25 | 26.12 | 26.12 | 25.88 | 25.88 | 25.88 |
| Bentonitie CH-325 | 1 | 1 | 0.99 | 0.99 | 0.99 |
| Walnutshell flour -325 | | | | | |

TABLE 1-continued

| | | | | | |
|---|---|---|---|---|---|
| Potato Starch - CLS | 50 | 50 | | | |
| XL Potato Starch | | | | | 50 |
| XL Pea Starch | | | 50 | | |
| XL Corn Starch | | | | 50 | |
| Asbury A-625 Graphite | | | | | |
| Asbury A99 Graphite | | | | | |
| Asbury 4602 Graphite | | | | | |
| Asbury 4014 graphite | 5 | 5 | | | |
| F240 Methocel | 6 | 6 | 6 | 6 | 6 |
| Sodium Stearate | 1 | 1 | 1 | 1 | 1 |
| Firing Cycle | | | | | |
| ramp >1200° C./soak T/soak time | 75/1405/10 | 50/1425/10 | 50/1405/10 | 50/1405/10 | 50/1405/10 |
| Properties | | | | | |
| CTE ($\times 10^{-7}$ °C.$^{-1}$) RT-800° C. | 17.7 | 13.3 | 18.4 | 20.4 | 18 |
| CTE ($\times 10^{-7}$ °C.$^{-1}$) 500-900° C. | 23.7 | 20 | 25 | 26.6 | 18.4 |
| MOR (psi) | 210 | 209 | 208 | 253 | 126 |
| MOR (normalized to solid rod) | 1222 | 1216 | 1210 | 1472 | 733 |
| E (Mpsi) | 0.12 | 0.14 | 0.11 | 0.1 | 0.081 |
| Strain tolerance (%) | 0.18 | 0.15 | 0.19 | 0.25 | 0.16 |
| TSP (MOR$_{RT}$/(E$_{RT}$*CTE$_{500-900}$) | 738 | 746 | 756 | 951 | 845 |
| TSL | 1238 | 1246 | 1256 | 1451 | 1345 |
| Porosity (%) | 68.2 | 65.9 | 64.6 | 62.3 | 65.8 |
| d10 | 18.5 | 16.9 | 13.6 | 13.44 | 14.9 |
| d50 | 28.5 | 21.1 | 17.1 | 17.1 | 22.7 |
| d90 | 55.1 | 51.1 | 39.6 | 42.7 | 41.7 |
| $d_f$ | 0.35 | 0.20 | 0.20 | 0.21 | 0.34 |
| $d_b$ | 1.28 | 1.62 | 1.52 | 1.71 | 1.18 |
| PCF | 53.11 | 40.66 | 42.49 | 36.41 | 55.73 |

| | EX. 17 | EX. 18 | EX. 19 | EX. 20 |
|---|---|---|---|---|
| Raw Materials | | | | |
| Fcor Talc | | | | |
| JF500 talc | 23.25 | 23.47 | 23.47 | 23.47 |
| JF150 Talc | | | | |
| 96-67 Talc | | | | |
| Spinel 25 (5 μm) | 24.77 | 25 | 25 | 25 |
| HVA Alumina | 9.25 | 9.34 | 9.34 | 9.34 |
| A3000 Alumina | | | | |
| Aluminum trihydrate | | | | |
| CHC-94 Kaolin | | | | |
| FHC Kaolin | 15.85 | 16 | 16 | 16 |
| CSG-04 Kaolin | | | | |
| Imsil A-25 | 25.88 | 26.12 | 26.12 | 26.12 |
| Bentonitie CH-325 | 0.99 | 1 | 1 | 1 |
| Walnutshell flour -325 | | | | |
| Potato Starch - CLS | | | | |
| XL Potato Starch | 50 | | | |
| XL Pea Starch | | 50 | 50 | 35 |
| XL Corn Starch | | | | |
| Asbury A-625 Graphite | | | | |
| Asbury A99 Graphite | | | | |
| Asbury 4602 Graphite | | | | |
| Asbury 4014 graphite | 5 | 5 | 5 | 5 |
| F240 Methocel | 6 | 6 | 6 | 6 |
| Sodium Stearate | 1 | 1 | 1 | 1 |
| Firing Cycle | | | | |
| ramp >1200° C./soak T/soak time | 50/1405/10 | 100/1415/8 | 50/1405/10 | 50/1405/10 |
| Properties | | | | |
| CTE ($\times 10^{-7}$ °C.$^{-1}$) RT-800° C. | 17.3 | 19 | 17.5 | 18.4 |
| CTE ($\times 10^{-7}$ °C.$^{-1}$) 500-900° C. | 24.2 | 26.3 | 24.7 | 25.5 |
| MOR (psi) | 228 | 190 | 354 | 539 |
| MOR (normalized to solid rod) | 1095 | 1105 | 1429 | 2176 |
| E (Mpsi) | 0.15 | 0.096 | 0.22 | 0.34 |
| Strain tolerance (%) | 0.15 | 0.20 | 0.16 | 0.16 |
| TSP (MOR$_{RT}$/(E$_{RT}$*CTE$_{500-900}$) | 628 | 753 | 651 | 622 |
| TSL | 1128 | 1253 | 1151 | 1122 |
| Porosity (%) | 69.1 | 66 | 65.1 | 62.6 |
| d10 | 17.1 | 15.5 | 13.9 | 12 |
| d50 | 26 | 19.5 | 17.1 | 15.2 |

TABLE 1-continued

| | | | | |
|---|---|---|---|---|
| d90 | 47.9 | 38.5 | 29.9 | 24.3 |
| $d_f$ | 0.34 | 0.21 | 0.19 | 0.21 |
| $d_b$ | 1.18 | 1.18 | 0.94 | 0.81 |
| PCF | 58.33 | 55.96 | 69.58 | 77.36 |

| | EX. 21 | EX. 22 | EX. 23 | EX. 24 | Ex. 25 |
|---|---|---|---|---|---|
| Raw Materials | | | | | |
| Fcor Talc | | | | | |
| JF500 talc | 23.47 | 23.47 | 23.47 | 23.47 | 27.92 |
| JF150 Talc | | | | | |
| 96-67 Talc | | | | | |
| Spinel 25 (5 μm) | 25 | 25 | 25 | 25 | 20.00 |
| HVA Alumina | 9.34 | 9.34 | 9.34 | 9.34 | 12.92 |
| A3000 Alumina | | | | | |
| Aluminum trihydrate | | | | | |
| CHC-94 Kaolin | | | | | |
| FHC Kaolin | 16 | 16 | 16 | 16 | 16.00 |
| CSG-04 Kaolin | | | | | |
| lmsil A-25 | 26.12 | 26.12 | 26.12 | 26.12 | 23.3 |
| Bentonitie CH-325 | 1 | 1 | 1 | 1 | |
| Walnutshell flour -325 | | | | | |
| Potato Starch - CLS | | | | | |
| XL Potato Starch | 48.3 | 40 | 30 | 20 | 50.00 |
| XL Pea Starch | | | | | |
| XL Corn Starch | | | | | |
| Asbury A-625 Graphite | | | | | |
| Asbury A99 Graphite | | | | | |
| Asbury 4602 Graphite | 21.3 | | | | |
| Asbury 4014 graphite | | 5 | 5 | 5 | 5 |
| F240 Methocel | 6 | 6 | 6 | 6 | 6 |
| Sodium Stearate | 1 | 1 | 1 | 1 | 1 |
| Firing Cycle | | | | | |
| ramp >1200° C/soak T/soak time | 50/1405/10 | 50/1405/10 | 50/1405/10 | 50/1405/10 | 15/1405/11 |
| Properties | | | | | |
| CTE ($\times 10^{-7}$ °C.$^{-1}$) RT-800° C. | 18.1 | 18 | 18 | 18 | 18.3 |
| CTE ($\times 10^{-7}$ °C.$^{-1}$) 500-900° C. | 24.1 | 25 | 25.2 | 25.5 | 25.2 |
| MOR (psi) | 354 | 557 | 713 | 878 | 159 |
| MOR (normalized to solid rod) | 886 | 1394 | 1784 | 2197 | 925 |
| E (Mpsi) | 0.2 | 0.37 | 0.52 | 0.52 | 0.087 |
| Strain tolerance (%) | 0.18 | 0.15 | 0.14 | 0.17 | .18 |
| TSP ($MOR_{RT}/(E_{RT}*CTE_{500-900})$) | 734 | 602 | 544 | 662 | 725 |
| TSL | 1234 | 1102 | 1044 | 1162 | 1225 |
| Porosity (%) | 70.5 | 65.2 | 61.8 | 57.8 | 68.2 |
| d10 | 18.1 | 15 | 11.8 | 9.8 | 13.89 |
| d50 | 25.3 | 23.1 | 19 | 15.6 | 18.66 |
| d90 | 39.8 | 43.9 | 33.4 | 29.8 | 41.95 |
| $d_f$ | 0.28 | 0.35 | 0.38 | 0.37 | 0.26 |
| $d_b$ | 0.86 | 1.25 | 1.14 | 1.28 | 1.50 |
| PCF | 82.20 | 52.11 | 54.36 | 45.08 | 45.35 |

Comparative Examples 1-6

Comparative Examples 1-6 are porous ceramic honeycomb structures made without spinel and, accordingly, have more microcracking than porous ceramic honeycomb structures made according to embodiments described herein. The precursor batch compositions and firing cycles for Comparative Examples 1-6 are as indicated in Table 2. The firing cycle row in Table 2 lists "ramp>1200° C./ramp T/ramp time," which indicates the ramp rate in ° C./hr from 1200° C. to the soak temperature, the soak temperature, and the time (in hours) the porous ceramic honeycomb structure is held at the soak temperature. In addition, properties of the comparative porous ceramic honeycomb structures, such as MOR, normalized MOR, strain tolerance, TSP, etc. are provided in Table 2.

TABLE 2

| Batch Code | Comp. 1 | Comp. 2 | Comp. 3 | Comp. 4 | Comp. 5 | Comp. 6 |
|---|---|---|---|---|---|---|
| Raw Materials | | | | | | |
| Fcor Talc | | | | | | |
| JF500 talc | | | | | | |
| 1E150 Talc | 41.54 | 41.54 | 38.73 | 38.73 | 38.73 | 38.73 |
| 96-67 Talc | | | | | | |
| Spinel 25 (5 μm) | | | | | | |
| HVA Alumina | 28.03 | 28.03 | 13.66 | 13.66 | 13.66 | 13.66 |
| A3000 Alumina | | | | | | |

TABLE 2-continued

| Batch Code | Comp. 1 | Comp. 2 | Comp. 3 | Comp. 4 | Comp. 5 | Comp. 6 |
|---|---|---|---|---|---|---|
| Aluminum trihydrate | | | 18.53 | 18.53 | 18.53 | 18.53 |
| CHC-94 Kaolin | | | | | | |
| FHC Kaolin | | | | | | |
| CSG-04 Kaolin | 13.85 | 13.85 | 14.16 | 14.16 | 14.16 | 14.16 |
| Imsil A-25 | 16.59 | 16.59 | 14.92 | 14.92 | 14.92 | 14.92 |
| Bentonitie CH-325 | | | | | | |
| Walnutshell flour -325 | | | | | | |
| Potato Starch - CLS | | | | | | |
| XL Potato Starch | 26 | 26 | 26 | 26 | 50 | 50 |
| XL Pea Starch | | | | | | |
| XL Corn Starch | | | | | | |
| Asbury A-625 Graphite | | | | | | |
| Asbury A99 Graphite | 16 | 16 | 16 | 16 | | |
| Asbury 4602 Graphite | | | | | | |
| Asbury 4014 graphite | | | | | | |
| F240 Methocel | 6 | 6 | 4 | 4 | 4 | 4 |
| Sodium Stearate | 0.7 | 0.7 | 0.7 | 0.7 | 0.7 | 0.7 |
| Firing Cycle | | | | | | |
| ramp >1200° C./soak T/soak | 50/1405/10 | 50/1425/10 | 50/1405/10 | 50/1425/10 | 50/1405/10 | 50/1425/10 |
| Properties | | | | | | |
| CTE ($\times 10^{-7}$ °C.$^{-1}$) RT-800° C. | 12.8 | 8.4 | 9.2 | 9 | 14.3 | 10.6 |
| CTE ($\times 10^{-7}$ °C.$^{-1}$) 500-900° C. | 19.2 | 15.9 | 16.5 | 15.8 | 21.2 | 17.4 |
| MOR (psi) | 97 | 76 | 77 | 80 | 85 | 65 |
| MOR (normalized to solid rod) | 564 | 442 | 448 | 465 | 494 | 378 |
| E (Mpsi) | 0.11 | 0.13 | 0.11 | 0.13 | 0.07 | 0.06 |
| Strain tolerance (%) | 0.09 | 0.06 | 0.07 | 0.06 | 0.12 | 0.11 |
| TSP ($MOR_{RT}/(E_{RT}*CTE_{500-900})$) | 459 | 368 | 424 | 389 | 573 | 623 |
| TSL | 959 | 868 | 924 | 889 | 1073 | 1123 |
| Porosity (%) | 65.3 | 61.7 | 66.6 | 64.7 | 64.6 | 62.3 |
| d10 | 9 | 12.1 | 6 | 7 | 20.7 | 20.9 |
| d50 | 19.8 | 24.2 | 16.3 | 15.5 | 31.2 | 33 |
| d90 | 45.8 | 55.6 | 34.4 | 31.2 | 69.8 | 77 |
| $d_f$ | 0.55 | 0.5 | 0.63 | 0.55 | 0.34 | 0.37 |
| $d_b$ | 1.86 | 1.80 | 1.74 | 1.56 | 1.57 | 1.70 |
| PCF | 35.13 | 34.33 | 38.22 | 41.44 | 41.05 | 36.65 |

As can be seen from a comparison of Table 1 and Table 2, porous ceramic honeycomb articles made according to embodiments have higher MOR, normalized MOR, strain tolerance, CTE, etc. than the comparative porous ceramic honeycomb articles that were not made in accordance with embodiments disclosed and described herein. Regarding the higher TSP in the Examples, this is made possible by the high strain tolerance associated with the high porosity low microcracked ceramic structures. Further, as shown in Table 1 and Table 2 above, very narrow pore diameters as measured by, for example, d-factor, are substantially better in the Examples than in the Comparative Examples.

Comparative Examples 7-10

Comparative Examples 7-10 are porous ceramic honeycomb structures made with decreasing amounts of spinel. The porous ceramic honeycomb structures having less spinel comprise more microcracking than porous ceramic honeycomb structures having higher spinel contents. The precursor batch compositions and firing cycles for Comparative Examples 7-10 are as indicated in Table 3. The firing cycle row in Table 3 lists "ramp>1200° C./ramp T/ramp time," which indicates the ramp rate in ° C./hr from 1200° C. to the soak temperature, the soak temperature, and the time (in hours) the porous ceramic honeycomb structures is held at the soak temperature. In addition, properties of the comparative porous ceramic honeycomb structures, such as MOR, normalized MOR, strain tolerance, TSP, etc. are provided in Table 3.

TABLE 3

| Batch Code | Comp. 7 | Comp. 8 | Comp. 9 | Comp. 10 |
|---|---|---|---|---|
| Raw Materials | | | | |
| Fcor Talc | | | | |
| JF500 talc | 32.37 | 36.82 | 41.27 | 45.72 |
| 1E150 Talc | | | | |
| 96-67 Talc | | | | |
| Spinel 25 (5 μm) | 15.00 | 10.00 | 5.00 | 0.00 |
| HVA Alumina | 16.50 | 20.08 | 23.66 | 27.24 |
| A3000 Alumina | | | | |
| Aluminum trihydrate | | | | |
| CHC-94 Kaolin | | | | |

TABLE 3-continued

| Batch Code | Comp. 7 | Comp. 8 | Comp. 9 | Comp. 10 |
|---|---|---|---|---|
| FHC Kaolin | 16.00 | 16.00 | 16.00 | 16.00 |
| CSG-04 Kaolin | | | | |
| Imsil A-25 | 20.48 | 17.66 | 14.84 | 12.02 |
| Bentonitie CH-325 | | | | |
| Walnutshell flour -325 | | | | |
| Potato Starch - CLS | | | | |
| XL Potato Starch | 50.00 | 50.00 | 50.00 | 50.00 |
| XL Pea Starch | | | | |
| XL Corn Starch | | | | |
| Asbury A-625 Graphite | | | | |
| Asbury A99 Graphite | | | | |
| Asbury 4602 Graphite | | | | |
| Asbury 4014 graphite | 5 | 5 | 5 | 5 |
| F240 Methocel | 6 | 6 | 6 | 6 |
| Sodium Stearate | 1 | 1 | 1 | 1 |
| Firing Cycle ramp >1200° C./soak T/soak time | 15/1405/12 | 15/1405/13 | 15/1405/14 | 15/1405/15 |
| Properties | | | | |
| CTE ($\times 10^{-7}$ °C.$^{-1}$) RT-800° C. | 16.2 | 14.9 | 13.1 | 12.7 |
| CTE ($\times 10^{-7}$ °C.$^{-1}$) 500-900° C. | 23.1 | 20.8 | 17.9 | 18.8 |
| MOR (psi) | 106 | 80 | 69 | 59 |
| MOR (normalized to solid rod) | 517 | 465 | 401 | 343 |
| E (Mpsi) | 0.077 | 0.063 | 0.072 | 0.069 |
| Strain tolerance (%) | 0.14 | 0.13 | 0.10 | 0.09 |
| TSP (MOR$_{RT}$/(E$_{RT}$*CTE$_{500-900}$) | 597 | 612 | 535 | 454 |
| TSL | 1097 | 1112 | 1035 | 954 |
| Porosity (%) | 68.7 | 69.6 | 68.4 | 66.7 |
| d10 | 14.46 | 14.07 | 14.86 | 15.57 |
| d50 | 21.16 | 19.64 | 22.50 | 23.16 |
| d90 | 52.33 | 45.05 | 58.91 | 69.02 |
| $d_f$ | 0.32 | 0.28 | 0.34 | 0.33 |
| $d_b$ | 1.79 | 1.58 | 1.96 | 2.31 |
| PCF | 38.39 | 44.12 | 34.94 | 28.90 |

As can be seen from a comparison of Table 1 and Table 3, porous ceramic honeycomb articles made according to embodiments have higher MOR, normalized MOR, strain tolerance, CTE, etc. than the comparative porous ceramic honeycomb articles that have less than about 25% by weight spinel. Further, Table 3 shows that as the amount of spinel in the porous ceramic honeycomb article decreases, MOR, normalized MOR, strain tolerance, TSP, etc. also decrease. In contrast, Table 1 above shows that porous ceramic honeycomb bodies having more than 15%, by weight spinel have desired MOR, normalized MOR, strain tolerance, and TSP.

Porous ceramic honeycomb structures and articles according to embodiments disclosed and described herein have high porosity and thin webs, as described herein, which reduce back pressure when the ceramic honeycomb structures and articles are used in filtration systems. The porous ceramic structures and articles according to embodiments have high strength compared to structures and articles with similar porosities and channel wall thicknesses by forming the porous honeycomb structures and articles from the precursor batch compositions and pore formers from the materials and with the particles sizes disclosed herein.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of manufacturing a ceramic honeycomb structure, comprising:
    forming a cordierite precursor batch composition mixture comprising a combination of constituent materials comprising:
        inorganic particles comprised of magnesia source particles, silica source particles, and alumina source particles, the inorganic particles having a median particle diameter less than or equal to about 10 μm, wherein the magnesia source particles or the alumina source particles comprise spinel particles and the amount of silica source is about 13% to about 24% by weight of the inorganic particles, and
        at least one starch-based pore former having a median particle diameter greater than or equal to about 10 μm;
    forming the mixture of ceramic precursor batch composition and at least one starch-based pore former into a green body having a honeycomb web structure of intersecting walls; and
    firing the green ceramic body to yield the ceramic honeycomb structure comprising a predominant cordierite crystalline phase.

2. The method of claim 1 wherein the inorganic particles have a median particle size from greater than or equal to about 4 μm to less than or equal to about 10 μm.

3. The method of claim 2 wherein the spinel particles comprise magnesium aluminate spinel.

4. The method of claim 3 wherein the precursor batch composition comprises greater than about 15% by weight spinel.

5. The method of claim 4 wherein the precursor batch composition comprises greater than or equal to about 25% by weight spinel.

6. The method of claim 5 wherein the batch composition comprises from greater than or equal to about 25% by weight spinel to about 40% by weight spinel.

7. The method of claim 6 wherein the inorganic particles comprise a talc.

8. The method of claim 7 wherein the talc has a median particle diameter of less than or equal to about 8 µm.

9. The method of claim 7 wherein the talc has a median particle diameter of greater than or equal to about 3 µm to less than or equal to about 10 µm.

10. The method of claim 1 wherein the amount of alumina source is about 20% to about 35% by weight of the inorganic particles.

11. The method of claim 10 wherein the inorganic particles comprise a clay.

12. The method of claim 11 wherein the clay is present in the mixture up to about 20% by weight of the inorganic particles.

13. The method of claim 12 wherein the clay is present in the mixture from about 10% to about 18% by weight of the inorganic particles.

14. The method of claim 1 wherein the mixture further comprises a binder and a liquid vehicle in amounts sufficient to plasticize the mixture.

15. The method of claim 1 wherein the ceramic structure is comprised predominantly of a cordierite crystalline phase.

16. The method of claim 1 wherein the ceramic honeycomb structure comprises between 5% and 15% glass phase.

17. A method of manufacturing a ceramic honeycomb structure, comprising:

forming a cordierite precursor batch composition mixture comprising a combination of constituent materials comprising:
  inorganic particles comprised of magnesia source particles, silica source particles, and alumina source particles, the inorganic particles having a median particle diameter less than or equal to about 10 µm, wherein the magnesia source particles or the alumina source particles comprise spinel particles, and
  at least one starch-based pore former having a median particle diameter greater than or equal to about 10 µm;

forming the mixture of ceramic precursor batch composition and at least one starch-based pore former into a green body having a honeycomb web structure of intersecting walls; and firing the green ceramic body to yield the ceramic honeycomb structure comprising a predominant cordierite crystalline phase, wherein the ceramic honeycomb structure comprises:
  a total porosity greater than or equal to about 55%;
  an average wall thickness less than or equal to about 150 µm;
  a median pore diameter greater than or equal to about 10 µm;
  a $d_f$ less than or equal to about 0.45, where $d_f=(d_{50}-d_{10})/d_{50}$; and
  a strength (MOR/CFA) greater than or equal to about 900 psi.

* * * * *